(12) United States Patent
Thibideau

(10) Patent No.: US 11,197,588 B1
(45) Date of Patent: Dec. 14, 2021

(54) AUTOMATIC VEHICULAR SANITIZER DISPENSER

(71) Applicant: Tracy Thibideau, Ingersoll (CA)

(72) Inventor: Tracy Thibideau, Ingersoll (CA)

( * ) Notice: Subject to any disclaimer, the term of this patent is extended or adjusted under 35 U.S.C. 154(b) by 0 days.

(21) Appl. No.: 16/995,957

(22) Filed: Aug. 18, 2020

(51) Int. Cl.
*A47K 5/12* (2006.01)
*B60R 11/00* (2006.01)

(52) U.S. Cl.
CPC ..... *A47K 5/1217* (2013.01); *B60R 2011/0003* (2013.01)

(58) Field of Classification Search
CPC .............. A47K 5/1217; B60R 2011/0003
See application file for complete search history.

(56) References Cited

U.S. PATENT DOCUMENTS

| D513,387 S | 1/2006 | Limbert |
| 8,261,941 B2 | 9/2012 | Woo |
| 8,353,427 B2 | 1/2013 | Landauer |
| 8,602,257 B2 | 12/2013 | Godsell |
| 9,758,101 B2 | 9/2017 | Clair-Chalupka |
| 10,028,624 B1 | 7/2018 | Robinson |
| 2015/0250908 A1 | 9/2015 | Maupin |
| 2016/0221019 A1* | 8/2016 | Bassett ............... B05B 15/30 |
| 2017/0112329 A1* | 4/2017 | Babikian ........... B05B 11/0097 |
| 2021/0100406 A1* | 4/2021 | Gage ................... B60R 16/02 |
| 2021/0145220 A1* | 5/2021 | Lang ................. A47K 5/1205 |

FOREIGN PATENT DOCUMENTS

WO      2016094969      6/2016

* cited by examiner

*Primary Examiner* — Donnell A Long

(57) ABSTRACT

The automatic vehicular sanitizer dispenser dispenses a hand sanitizer automatically. By automatically is meant that a touchless interface controls the dispensing of the hand sanitizer. The automatic vehicular sanitizer dispenser includes a vehicle, the reservoir and the control circuit. The reservoir contains the hand sanitizer. The control circuit controls and powers the operation of the automatic vehicular sanitizer dispenser and the dispensing of the hand sanitizer. The control circuit attaches to the reservoir to form a single structure. The formed single structure integrally mounts into the vehicle.

17 Claims, 5 Drawing Sheets

AUTOMATIC VEHICULAR SANITIZER DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of medical and veterinary science, more specifically, an accessory for dispensing a liquid disinfectant for use with objects other than foodstuffs and contact lenses. (A61L2/18).

SUMMARY OF INVENTION

The automatic vehicular sanitizer dispenser is configured for use in a vehicle. The automatic vehicular sanitizer dispenser is configured for use with a hand sanitizer. The automatic vehicular sanitizer dispenser dispenses the hand sanitizer automatically. By automatically is meant that a touchless interface controls the dispensing of the hand sanitizer. The automatic vehicular sanitizer dispenser comprises the vehicle, the reservoir, and the control circuit. The reservoir contains the hand sanitizer. The control circuit controls and powers the operation of the automatic vehicular sanitizer dispenser and the dispensing of the hand sanitizer. The control circuit attaches to the reservoir to form a single structure. The formed single structure integrally mounts into the vehicle. By integrally mounts is meant that: a) the automatic vehicular sanitizer dispenser is permanently mounted in vehicle such that the hand sanitizer is accessible from within the vehicle; and, b) the control circuit is fully incorporated into a vehicle engine control unit such that no external electrical connection are required at any time for the operation of the automatic vehicular sanitizer dispenser.

These together with additional objects, features and advantages of the automatic vehicular sanitizer dispenser will be readily apparent to those of ordinary skill in the art upon reading the following detailed description of the presently preferred, but nonetheless illustrative, embodiments when taken in conjunction with the accompanying drawings.

In this respect, before explaining the current embodiments of the automatic vehicular sanitizer dispenser in detail, it is to be understood that the automatic vehicular sanitizer dispenser is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automatic vehicular sanitizer dispenser.

It is therefore important that the claims be regarded as including such equivalent construction insofar as they do not depart from the spirit and scope of the automatic vehicular sanitizer dispenser. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
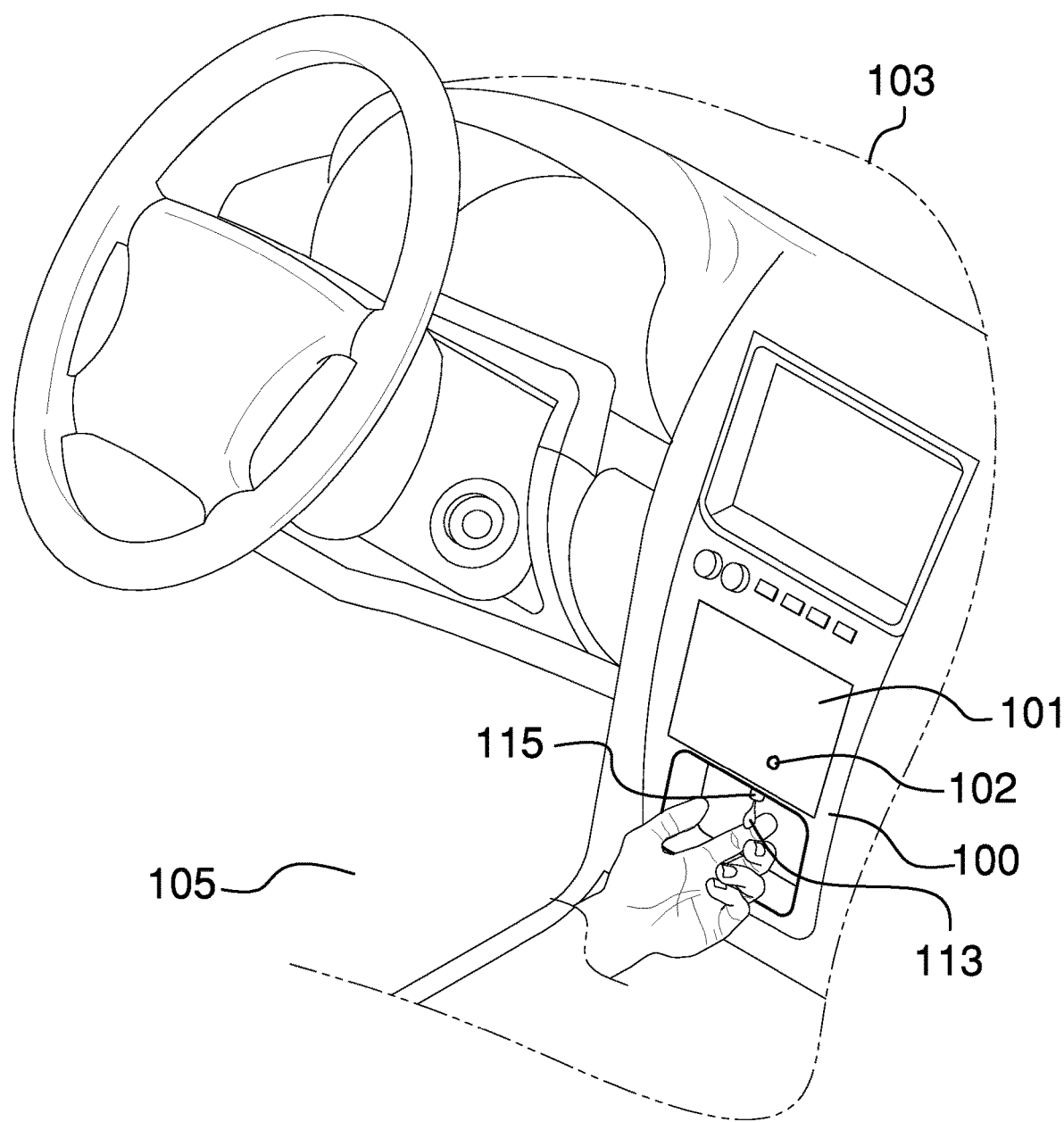
FIG. 1 is a perspective view of an embodiment of the disclosure.
Figure 2:
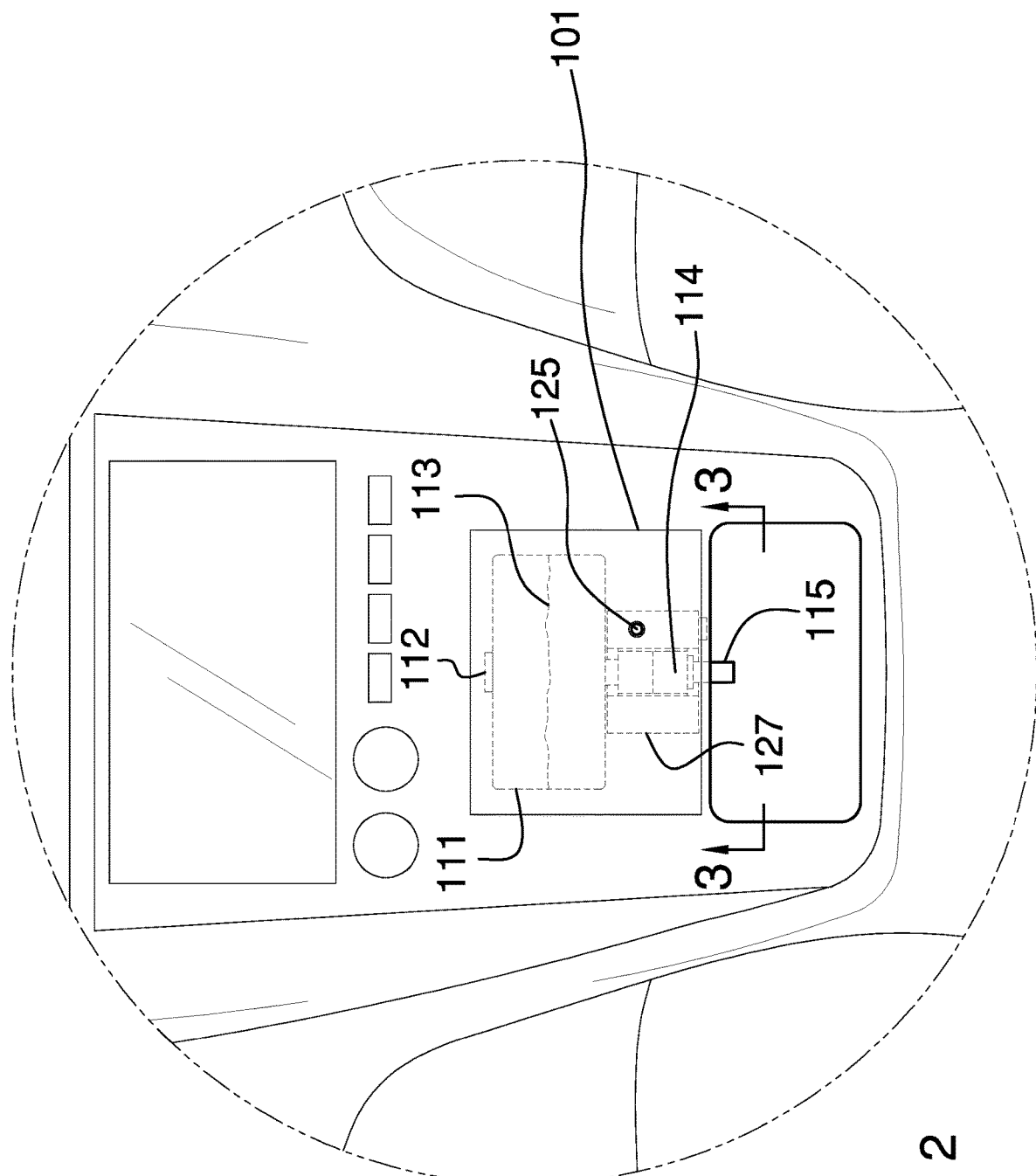
FIG. 2 is a front view of an embodiment of the disclosure.
Figure 3:
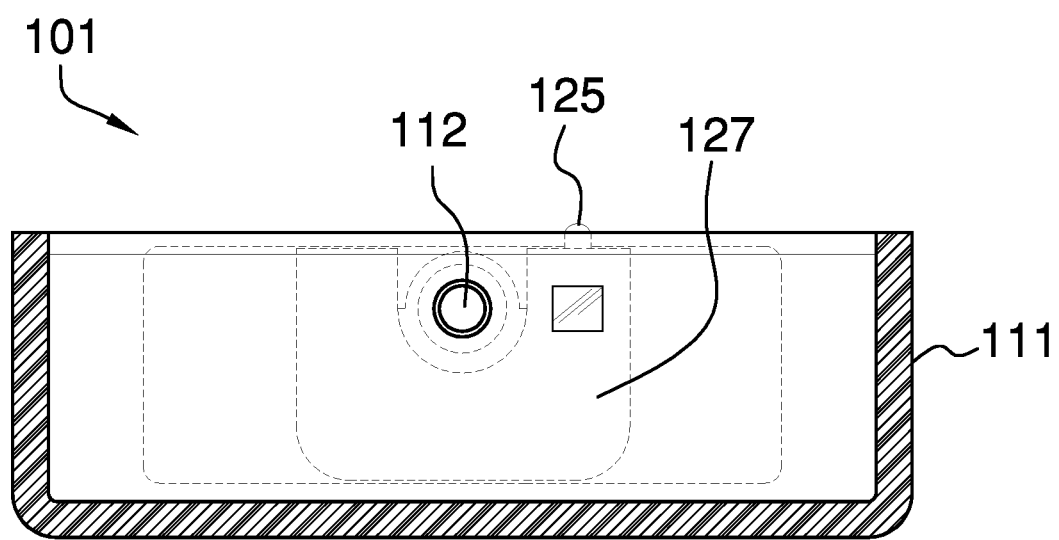
FIG. 3 is a cross-sectional view of an embodiment of the disclosure across 3-3 as shown in FIG. 2.
Figure 4:
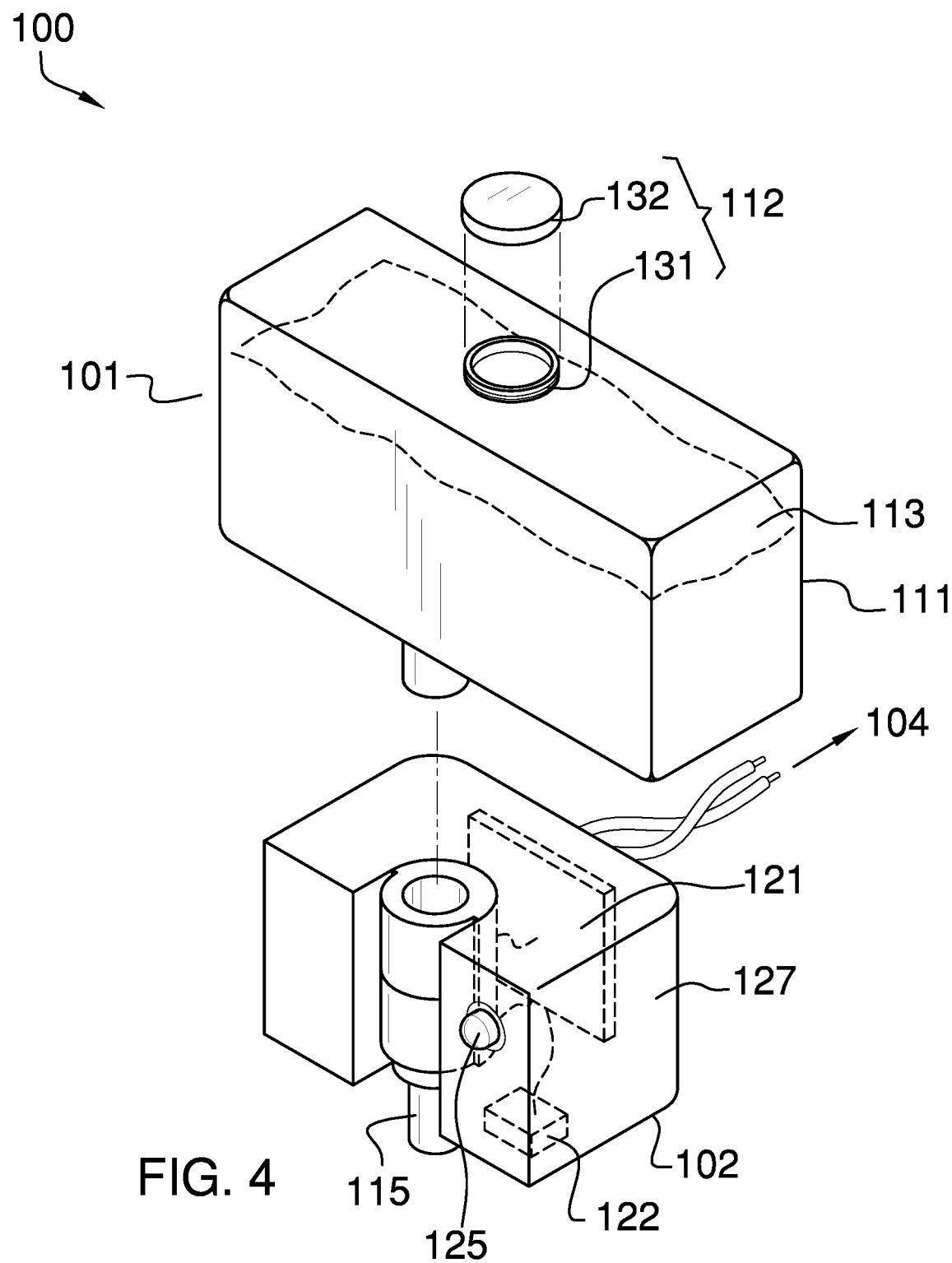
FIG. 4 is an exploded view of an embodiment of the disclosure.
Figure 5:
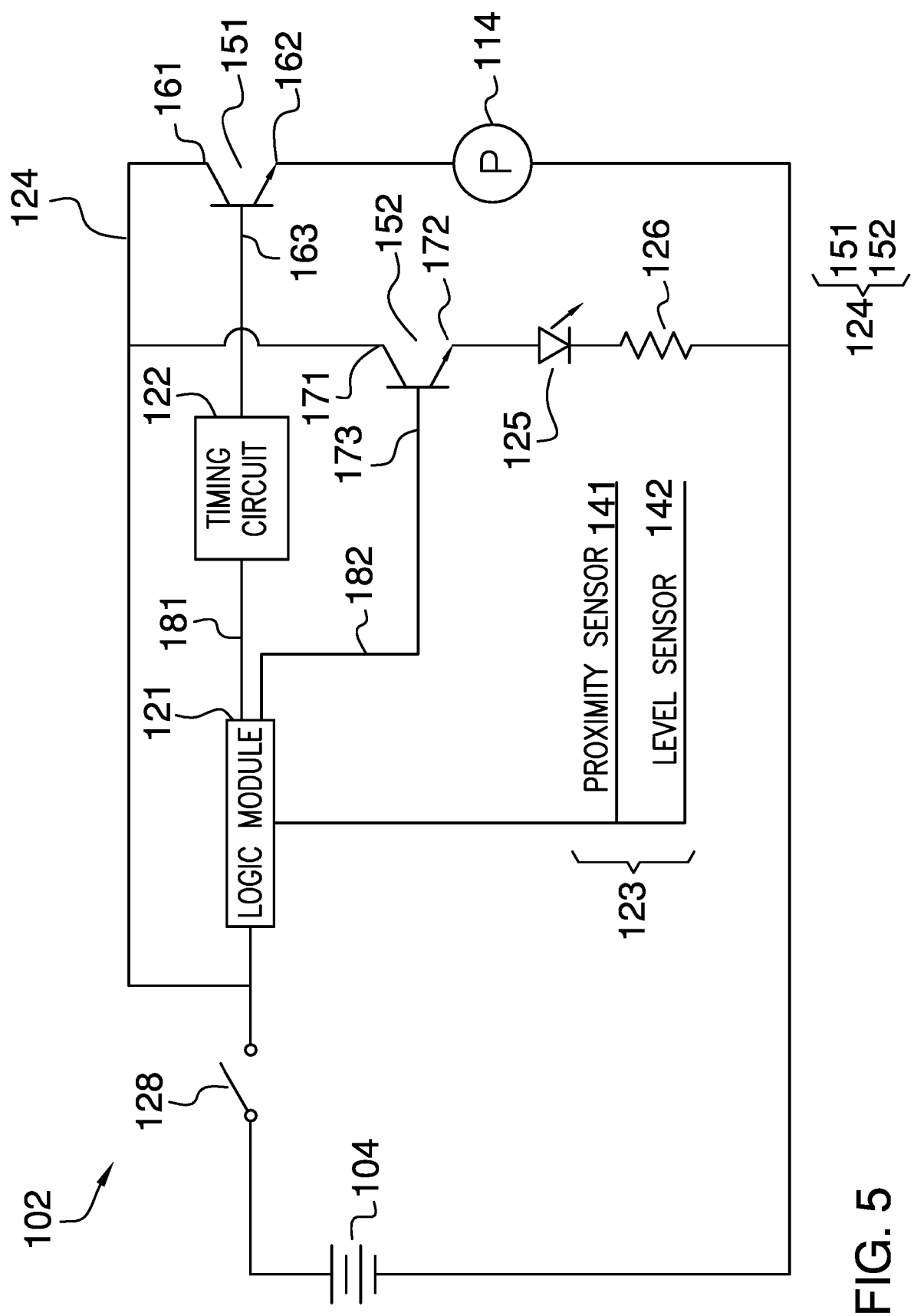
FIG. 5 is a schematic view of an embodiment of the disclosure.

Detailed reference will now be made to one or more potential embodiments of the disclosure, which are illustrated in FIGS. 1 through 5.

The automatic vehicular sanitizer dispenser 100 (hereinafter invention) is configured for use in a vehicle 103. The invention 100 is configured for use with a cleaning solution. The invention 100 dispenses the cleaning solution automatically. By automatically is meant that a touchless interface controls the dispensing of the cleaning solution. The invention 100 comprises the vehicle 103, the reservoir 101, and the control circuit 102. The reservoir 101 contains the cleaning solution. The control circuit 102 controls and powers the operation of the invention 100 and the dispensing of the cleaning solution. The control circuit 102 attaches to the reservoir 101 to form a single structure. The formed single structure integrally mounts into the vehicle 103. By integrally mounts is meant that: a) the invention 100 is permanently mounted in vehicle 103 such that the cleaning solution is accessible from within the passenger space 105 of the vehicle 103; and, b) the control circuit 102 is fully incorporated into a vehicle 103 engine control unit such that no external electrical connection are required at any time for the operation of the invention 100.

In the first potential embodiment of the solution, the cleaning solution is a hand sanitizer 113. The vehicle 103 is defined elsewhere in this disclosure. The vehicle 103 further comprises a VECU 104 and a passenger space 105. The VECU 104 is defined elsewhere in this disclosure. The passenger space 105 is a chamber adapted to hold the people being transported by the vehicle 103.

The reservoir 101 is a mechanical structure. The reservoir 101 is a fluid impermeable structure. The reservoir 101 is configured for use in storing a cleaning solution. The reservoir 101 physically attaches to the control circuit 102. The control circuit 102 controls the discharge of the cleaning solution from the reservoir 101. The reservoir 101 comprises a containment housing 111, an access structure 112, a hand sanitizer 113, a pump 114, and a nozzle 115.

The containment housing 111 is a hollow structure. The containment housing 111 is an enclosed structure. The containment housing 111 is a fluid impermeable structure. The containment housing 111 is a rigid casing. The containment housing 111 contains the hand sanitizer 113 and the pump 114. The containment housing 111 is formed with all apertures and form factors necessary to allow the containment housing 111 to accommodate the use and operation of the invention 100. Methods to form a containment housing 111 suitable for the purposes described in this disclosure are well-known and documented in the mechanical arts. In the first potential embodiment of the disclosure, the containment housing 111 mechanically attaches to the control circuit 102 by inserting into the control circuit 102 housing 127.

The access structure 112 is a mechanical structure. The access structure 112 forms a fluidic connection that allows hand sanitizer 113 to flow through the access structure 112 and into the containment housing 111 for storage. The access structure further comprises a port 131 and a cap 132.

The port 131 is a prism-shaped structure. The port 131 has a tubular structure. The port 131 forms a fluidic connection between the interior of the containment housing 111 and the exterior of the containment housing 111 that allows the hand sanitizer 113 stored in the containment housing 111 to be replenished. The cap 132 is a prism-shaped structure. The cap 132 has a capped tube structure. The cap 132 is geometrically similar to the port 131. The inner dimension of the cap 132 is greater than the outer dimension of the port 131 such that the cap 132 can enclose the open congruent end of the port 131. The cap 132 attaches to the port 131 using a threaded connection.

The hand sanitizer 113 is the cleaning solution of the invention 100. The hand sanitizer 113 is defined elsewhere in this disclosure.

The pump 114 is a mechanical structure. The pump 114 forms a fluidic connection between the containment housing 111 and the nozzle 115. The pump 114 generates a pressure differential that transports the hand sanitizer 113 from the containment housing 111 to the nozzle 115 for discharge. The pump 114 is an electrically powered structure. The pump 114 electrically connects to the control circuit 102. The electrical energy required for the operation of the pump 114 is drawn from the control circuit 102. The control circuit 102 controls the operation of the pump 114.

The nozzle 115 is a port from which the hand sanitizer 113 is dispensed. The nozzle 115 is positioned such that the placement of a hand underneath the nozzle 115 will cause the pump 114 to discharge the hand sanitizer 113 directly on to the hand. The nozzle 115 is defined elsewhere in this disclosure.

The control circuit 102 is an electric circuit. The control circuit 102 electrically connects to the VECU 104 of the vehicle 103. The control circuit 102 draws electric energy from the VECU 104. The control circuit 102 provides the motive forces required to dispense a dose of the hand sanitizer 113. The control circuit 102 monitors the exterior space surrounding the nozzle 115 to determine if a hand is proximal to the nozzle 115. The control circuit 102 dispenses the hand sanitizer 113 when the control circuit 102 determines that the hand is proximal to the nozzle 115. The control circuit 102 monitors the amount of hand sanitizer 113 contained in the reservoir 101. The control circuit 102 generates a visible indication that the amount of hand sanitizer 113 contained within the reservoir 101 has fallen below a previously determined level.

The control circuit 102 comprises a logic circuit 121, a timing circuit 122, a plurality of sensors 123, a plurality of transistors 124, an LED 125, a limit resistor 126, a control circuit 102 housing 127, and a master switch 128. The control circuit 102 housing 127 contains the logic circuit 121, the timing circuit 122, the plurality of sensors 123, the plurality of transistors 124, the LED 125, the limit resistor 126, and the master switch 128. The logic circuit 121, the timing circuit 122, the plurality of sensors 123, the plurality of transistors 124, the LED 125, and the limit resistor 126, and the master switch 128 are electrically interconnected.

The logic circuit 121 is an electric circuit. The logic circuit 121 controls the operation of the pump 114. The logic circuit 121 initiates the operation of the pump 114 to dispense the hand sanitizer 113 through the nozzle 115. The logic circuit 121 monitors the level of the hand sanitizer 113 in the containment housing 111. The logic circuit 121 monitors the space around the nozzle 115. The logic circuit 121 is triggered to initiate the operation of the pump 114 when the logic circuit detects an object, such as a hand, underneath the nozzle 115. The logic circuit 121 measures the amount of the hand sanitizer 113 in the containment housing 111. When the logic circuit 121 detects that the measured amount of the hand sanitizer 113 contained in the containment housing 111 falls below a previously determined amount, the logic circuit 121 generates a visible indication of this condition.

The timing circuit 122 is a timing device. The timing circuit 122 is an electric circuit. The logic circuit 121 initiates the operation of the timing circuit 122. The timing circuit 122 electrically connects to the pump 114 signal 181 of the logic circuit 121. When the timing circuit 122 detects the pump 114 signal 181 the timing circuit 122 sends an electrical signal to the first transistor 151 for a previously determined amount of time. The timing circuit 122 controls the amount of hand sanitizer 113 that pump 114 discharges for use.

Each of the plurality of sensors 123 is an electric sensor. The logic circuit 121 monitors the operation of each of the plurality of sensors 123. A sensor selected from the plurality of sensors 123 indicates to the logic circuit 121 that an object is underneath the nozzle 115 of the reservoir 101. A sensor selected from the plurality of sensors 123 indicates to the logic circuit 121 the amount of hand sanitizer 113 contained within the containment housing 111 of the reservoir 101. The plurality of sensors 123 comprises a proximity sensor 141 and a level sensor 142.

The proximity sensor 141 is an electric sensor. The proximity sensor 141 detects the presence of an object in the proximity of the proximity sensor 141. When the proximity sensor 141 detects the presence of an object, the proximity sensor 141 generates an electric signal that the logic circuit 121 detects and interprets as its signal to initiate the operation of the pump 114.

The level sensor 142 is an electric sensor. The level sensor 142 detects the amount of hand sanitizer 113 contained within the containment housing 111. When the level sensor 142 detects the presence of an object, the level sensor 142 generates an electric signal that the logic circuit 121 detects and interprets as its signal to dispense a dose of the hand sanitizer 113. In the first potential embodiment of the disclosure, the level sensor 142 is selected from the group consisting of a float switch and a conductive sensor.

Each of the plurality of transistors 124 is an electrically controlled switching structure. The logic circuit 121 uses a first transistor 151 selected from the plurality of transistors 124 to control the operation of the pump 114. The logic circuit 121 uses a second transistor 152 selected from the plurality of transistors 124 to control the operation of the visual indication of the amount of hand sanitizer 113. The plurality of transistors 124 comprises a first transistor 151 and a second transistor 152.

The first transistor 151 is an electrically controlled switching structure. The first transistor 151 controls the flow of electricity from the master switch 128 of the control circuit 102 into the pump 114. The first transistor 151 electrically connects to the timing circuit 122. The first transistor 151 comprises a first collector 161, a first emitter 162, and a first base 163. The first transistor 151 operates as a switch. When a voltage is applied to the first base 163, electric current will flow into the first base 163 and the first transistor 151 will act like a closed switch allowing current to flow from the first collector 161 to the first emitter 162. When the voltage is removed from the first base 163, the first transistor 151 will act like an open switch disrupting current flow from the first collector 161 to the first emitter 162.

The first collector 161 is the lead of the first transistor 151 that electrically connects to the master switch 128. When the first base 163 enables the operation of the first transistor 151, the first collector 161 draws dc electrical energy from the VECU 104 and through the master switch 128 into the first transistor 151. The first emitter 162 is the lead of the first transistor 151 that electrically connects to the pump 114. When the first base 163 enables the operation of the first transistor 151, the first base 163 transfers the dc electrical energy received from the first collector 161 into the pump 114. The first base 163 is the lead of the first transistor 151 that electrically connects to the timing circuit 122. The first base 163 actuates the switching function of the first transistor 151.

When the logic circuit 121 initiates the operation of the timing circuit 122, the timing circuit 122 generates an electric current that enters the first transistor 151 through the first base 163. The logic circuit 121 initiates the operation of the timing circuit 122 through an electric signal provided through the pump 114 signal 181. The introduction of electric current into the first transistor 151 through the first base 163 causes the first transistor 151 to act like a closed switch that transfers dc electric energy into the pump 114.

The second transistor 152 is an electrically controlled switching structure. The second transistor 152 controls the flow of electricity from the master switch 128 of the control circuit 102 into the pump 114. The second transistor 152 electrically connects to the alarm signal 182 of the logic circuit 121. The second transistor 152 comprises a second collector 171, a second emitter 172, and a second base 173. The second transistor 152 operates as a switch. When a voltage is applied to the second base 173, electric current will flow into the second base 173 and the second transistor 152 will act like a closed switch allowing current to flow from the second collector 171 to the second emitter 172. When the voltage is removed from the second base 173, the second transistor 152 will act like an open switch disrupting current flow from the second collector 171 to the second emitter 172.

The second collector 171 is the lead of the second transistor 152 that electrically connects to the master switch 128. When the second base 173 enables the operation of the second transistor 152, the second collector 171 draws dc electrical energy from the VECU 104 and through the master switch 128 into the second transistor 152. The second emitter 172 is the lead of the second transistor 152 that electrically connects to the LED 125. When the second base 173 enables the operation of the second transistor 152, the second base 173 transfers the dc electrical energy received from the second collector 171 into the LED 125. The second base 173 is the lead of the second transistor 152 that electrically connects to the logic circuit 121. The second base 173 actuates the switching function of the second transistor 152.

The logic circuit 121 further comprises a pump 114 signal 181 and an alarm signal 182. The pump 114 signal 181 is an electric signal generated by the logic circuit 121. The activation of the proximity sensor 141 triggers the logic circuit 121 to generate the pump 114 signal 181. The alarm signal 182 is an electric signal generated by the logic circuit 121. The activation of the level sensor 142 triggers the logic circuit 121 to generate the alarm signal 182. The logic circuit 121 electrically connects to the second base 173 of the second transistor 152 using the alarm signal 182. The logic circuit 121 initiates the operation of the LED 125 through an electric signal provided through the alarm signal 182. The introduction of electric current into the second transistor 152 through the second base 173 causes the second transistor 152 to act like a closed switch that transfers dc electric energy into the LED 125.

The LED 125 is an electrical circuit element. The LED 125 is a diode. The LED 125 generates an illumination when an electric current passes through the LED 125. The generated illumination provides the visual indication of the amount of hand sanitizer 113 contained in the containment housing 111 is below the previously determined amount. The LED 125 forms a series electrical connection between the second emitter 172 of the second transistor 152 and the limit resistor 126.

The limit resistor 126 is an electric circuit element. The limit resistor 126 forms a series electrical connection between the LED 125 and the VECU 104 of the vehicle 103. The limit resistor 126 limits the flow of electricity through the LED 125.

The master switch 128 is a maintained switch. The master switch 128 enables and disables the operation of the control circuit 102. The master switch 128 controls the flow of dc electrical energy from the VECU 104 of the vehicle 103 into the control circuit 102. The master switch 128 electrically connects to the VECU 104 to the logic circuit 121 and the plurality of transistors 124 of the control circuit 102.

The control circuit 102 housing 127 is a rigid casing. The control circuit 102 housing 127 contains the balance of the control circuit 102. The control circuit 102 housing 127 is formed with all apertures and form factors necessary to allow the control circuit 102 housing 127 to accommodate the use and operation of the invention 100. Methods to form a control circuit 102 housing 127 suitable for the purposes described in this disclosure are well-known and documented in the mechanical arts.

The following definitions were used in this disclosure:

Alcohol: As used in this disclosure, an alcohol refers to an organic chemical structure that comprises a hydroxyl functional group.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Cap: As used in this disclosure, a cap is a protective cover that encloses a space or opening.

Capped Tube: As used in this disclosure, a capped tube is a tube with one closed end and one open end.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove dirt and detritus from a surface.

Cleaning Solution: As used in this disclosure, a cleaning solution is a chemical solution that contains a solvent used to dissolve and capture dirt and detritus from a surface. The cleaning solution often contains a cleaning agent.

Conductive Sensor: As used in this disclosure, a conductive sensor is a sensor used to detect the presence of a conductive liquid such as water. The conductive sensor comprises two electric terminals that present an electric voltage across them. An electric current passes between the two electrodes when the conductive liquid simultaneously immerses the two electrodes. A conductive sensor can be used to detect when the conductive liquid reaches a previously determined level by the placement of one of the two electrodes at that level.

Container: As used in this disclosure, a container is a structure that forms a protected space used to store and transport an object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disinfectant: As used in this disclosure, a disinfectant is a chemical that destroys or inhibits the activities of pathogenic microorganisms.

Dose: As used in this disclosure, the term dose refers to a specified measured quantity of a chemical substance that is to be incorporated or introduced into an organism or a mixture such as a recipe or a solution. The term dose often, but not necessarily, implies the introduction of a therapeutic substance or a pharmacologically active media into a patient.

Float Switch: As used in this disclosure, a float switch is a commercially available switch that is actuated by the level of liquid contained within a contained space. A common use of a float switch is in the operation of a bilge or sump pump. Specifically, when the level of accumulated liquid in a bilge or a sump exceeds a predetermined level, the float switch will actuate into a closed position that completes an electric circuit that provides electrical power to a pump that will remove the liquid from the bilge or sump. When the accumulated liquid falls below the predetermined level the float switch will actuate into an open position discontinuing the operation of the pump.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Functional Group: As used in this disclosure, a functional group is specific chemical structure that 1) defines the structure of a chemical family; and, 2) determines the properties of the chemical family. Common functional groups include, but are not limited to, aldehydes, alkanes, alkenes, alkynes, alcohols, amides, amines, carboxylic acids, esters, ethers, haloalkanes, haloalkenes, haloalkynes, and ketones. As a practical matter, the intention of this definition is to use the term functional group in the same manner as the term is commonly used in organic chemistry.

Gas: As used in this disclosure, a gas refers to a state (phase) of matter that is fluid and that fills the volume of the structure that contains it. Stated differently, the volume of a gas always equals the volume of its container.

Gel: As used in this disclosure, a gel is a substance comprising mostly of liquid (by mass) that is trapped in a cross-linked network structure that exhibits the properties of a solid.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Hand Sanitizer: As used in this disclosure, a hand sanitizer is a cleaning solution used for disinfecting hands. The hand sanitizer is a gel that has a high viscosity and high volatility. The high viscosity of the hand sanitizer allows the sanitizer to be held in a hand as a mass until the hand sanitizer is rubbed on the hands. The high volatility allows the hand sanitizer to evaporate rapidly after application. The hand sanitizer typically uses an alcohol as the cleaning agent.

Housing: As used in this disclosure, a housing is a rigid structure that encloses and protects one or more devices.

Hydroxyl: As used in this disclosure, a hydroxyl refers to a functional group comprising the chemical formulation OH. The hydroxyl is the primary functional group that forms alcohols. When unbound, the hydroxyl is considered an ion and is considered to be a radical.

Inner Dimension: As used in this disclosure, the term inner dimension describes the span from a first inside or interior surface of a container to a second inside or interior surface of a container. The term is used in much the same way that a plumber would refer to the inner diameter of a pipe.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Liquid: As used in this disclosure, a liquid refers to a state (phase) of matter that is fluid and that maintains, for a given pressure, a fixed volume that is independent of the volume of the container.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is programmable.

Maintained Switch: A used in this disclosure, a maintained switch is a switch that maintains the position that was set in the most recent switch actuation. A maintained switch works in an opposite manner to a momentary switch.

Microorganism: As used in this disclosure, a microorganism is an organism too small to be viewed by the unaided eye. Microorganisms are typically single celled organisms such as bacteria, yeast, viruses, protozoa, fungi and algae. A pathogen refers to a microorganism that has the potential to cause illness or disease.

Nozzle: As used in this disclosure, a nozzle is a device that receives fluid under pressure and releases the fluid in a controlled manner into an environment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Phase: As used in this disclosure, phase refers to the state of the form of matter. The common states of matter are solid, liquid, gas, and plasma.

Port: As used in this disclosure, a port is an aperture formed in an object that allows fluid to flow through the boundary of the object.

Protected Space: As used in this disclosure, a protected space is a negative space within which an object is stored. The protected space is enclosed by a barrier structure that: a) prevents damage to the object contained within the protected space; or, b) maintains an environment suitable within the protected space that is appropriate for the object.

Proximity Sensor: As used in this disclosure, a proximity sensor is an electrical device that senses the entry or presence of an object within a previously determined field of view.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a liquid.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force. See bimodal flexible structure.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Sight Glass: As used in this disclosure, a sight glass is a transparent structure that allows a user to see the level of a liquid within a container. A sight glass may or may not be calibrated to measure the volume of liquid within the container.

Solid: As used in this disclosure, a solid refers to a state (phase) of matter that: 1) has a fixed volume; and, 2) does not flow.

Solution: As used in this disclosure, a solution is a uniform mixture of two or more compounds in a liquid phase. The major component selected from the two or more compounds that forms the solution is called the solvent. The components remaining in the two or more compounds are called the solute. A polar solvent is a solvent formed from polar molecules. A non-polar solvent is a solvent formed from non-polar molecules. The rule of thumb that "like dissolves like" states that: a) solutes formed from polar molecules will dissolve in polar solvents but will not dissolve in non-polar solvents; and, b) solutes formed from non-polar molecules will dissolve in non-polar solvents but will not dissolve in polar solvents.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Touchless: As used in this disclosure, touchless refers to a device that can be operated through the motion of an individual without requiring physical contact between the individual and the device.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Viscosity: As used in this disclosure, viscosity refers to the resistance of a liquid or an elastic material to deformation. Higher viscosity would refer to a greater resistance to flow or to deformation.

Viscous: As used in this disclosure, a viscous material is a material with a viscosity such that the viscous material has characteristics intermediate between a liquid and a solid.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

Volatile: As used in this disclosure, volatile refers to a substance that will evaporate or sublimate into a gas state at normal temperature and pressure.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An automatic vehicular sanitizer dispenser comprising a vehicle, a reservoir, and a control circuit;
   wherein the automatic vehicular sanitizer dispenser is configured for use in a vehicle;
   wherein the automatic vehicular sanitizer dispenser is configured for use with a cleaning solution;
   wherein the automatic vehicular sanitizer dispenser dispenses the cleaning solution;
   wherein a touchless interface controls the dispensing of the cleaning solution;
   wherein the reservoir contains the cleaning solution;
   wherein the reservoir comprises a containment housing, an access structure, a hand sanitizer, a pump, and a nozzle;
   wherein the hand sanitizer is the cleaning agent of the automatic vehicular sanitizer dispenser;
   wherein the containment housing contains the hand sanitizer and the pump;
   wherein the access structure provides the hand sanitizer access to the containment structure;
   wherein the pump forms a fluidic connection between the containment housing and the nozzle;
   wherein the hand sanitized discharges from the automatic vehicular sanitizer dispenser through the nozzle;
   wherein the control circuit monitors the exterior space surrounding the nozzle to determine if an object is proximal to the nozzle;

wherein the control circuit dispenses the hand sanitizer when the control circuit determines that the object is proximal to the nozzle;
wherein the control circuit monitors the amount of hand sanitizer contained in the reservoir;
wherein the control circuit generates a visible indication that the amount of hand sanitizer contained within the reservoir has fallen below a previously determined level;
wherein the control circuit comprises a logic circuit, a timing circuit, a plurality of sensors, a plurality of transistors, an LED, a limit resistor, a control circuit housing, and a master switch;
wherein the control circuit housing contains the logic circuit, the timing circuit, the plurality of sensors, the plurality of transistors, the LED, the limit resistor, and the master switch;
wherein the logic circuit, the timing circuit, the plurality of sensors, the plurality of transistors, the LED, and the limit resistor, and the master switch are electrically interconnected.

2. The automatic vehicular sanitizer dispenser according to claim 1
wherein the control circuit controls and powers the operation of the automatic vehicular sanitizer dispenser;
wherein the control circuit controls and powers the dispensing of a cleaning solution;
wherein the vehicle further comprises a VECU and a passenger space;
wherein the passenger space is a chamber adapted to hold the people being transported by the vehicle;
wherein the control circuit attaches to the reservoir to form a single structure;
wherein the formed single structure integrally mounts into the vehicle;
wherein by integrally mounts is meant that: a) the automatic vehicular sanitizer dispenser is permanently mounted in vehicle such that the cleaning solution is accessible from within the passenger space of the vehicle; and, b) the control circuit is fully incorporated into a vehicle engine control unit such that no external electrical connection are required at any time for the operation of the automatic vehicular sanitizer dispenser.

3. The automatic vehicular sanitizer dispenser according to claim 2
wherein the reservoir is a mechanical structure;
wherein the reservoir is a fluid impermeable structure;
wherein the reservoir is configured for use in storing a cleaning solution;
wherein the reservoir physically attaches to the control circuit;
wherein the control circuit controls the discharge of the cleaning solution from the reservoir.

4. The automatic vehicular sanitizer dispenser according to claim 3
wherein the control circuit is an electric circuit;
wherein the control circuit electrically connects to the VECU of the vehicle;
wherein the control circuit draws electric energy from the VECU;
wherein the control circuit provides the motive forces required to dispense a dose of the cleaning solution.

5. The automatic vehicular sanitizer dispenser according to claim 4
wherein the containment housing is a hollow structure;
wherein the containment housing is an enclosed structure;
wherein the containment housing is a fluid impermeable structure;
wherein the containment housing is a rigid casing;
wherein the access structure is a mechanical structure;
wherein the access structure forms a fluidic connection that allows hand sanitizer to flow through the access structure and into the containment housing for storage;
wherein the nozzle is a port from which the hand sanitizer is dispensed;
wherein the nozzle is positioned such that the placement of an object underneath the nozzle will cause the pump to discharge the hand sanitizer directly on to the object.

6. The automatic vehicular sanitizer dispenser according to claim 5
wherein the pump is a mechanical structure;
wherein the pump forms a fluidic connection between the containment housing and the nozzle;
wherein the pump generates a pressure differential that transports the hand sanitizer from the containment housing to the nozzle for discharge;
wherein the pump is an electrically powered structure;
wherein the pump electrically connects to the control circuit;
wherein the electrical energy required for the operation of the pump is drawn from the control circuit;
wherein the control circuit controls the operation of the pump.

7. The automatic vehicular sanitizer dispenser according to claim 6
wherein the access structure further comprises a port and a cap;
wherein the port has a tubular structure;
wherein the port forms a fluidic connection between the interior of the containment housing and the exterior of the containment housing that allows the hand sanitizer stored in the containment housing to be replenished;
wherein the cap has a capped tube structure;
wherein the cap is geometrically similar to the port;
wherein the inner dimension of the cap is greater than the outer dimension of the port such that the cap can enclose the open congruent end of the port;
wherein the cap attaches to the port using a threaded connection.

8. The automatic vehicular sanitizer dispenser according to claim 7
wherein the logic circuit is an electric circuit;
wherein the logic circuit controls the operation of the pump;
wherein the logic circuit initiates the operation of the pump to dispense the hand sanitizer through the nozzle;
wherein the logic circuit monitors the level of the hand sanitizer in the containment housing;
wherein the logic circuit monitors the space around the nozzle;
wherein the logic circuit is triggered to initiate the operation of the pump when the logic circuit detects an object, such as a hand, underneath the nozzle;
wherein the logic circuit measures the amount of the hand sanitizer in the containment housing;
wherein when the logic circuit detects that the measured amount of the hand sanitizer contained in the containment housing falls below a previously determined amount, the logic circuit generates a visible indication of this condition.

9. The automatic vehicular sanitizer dispenser according to claim 8
  wherein the timing circuit is a timing device;
  wherein the timing circuit is an electric circuit;
  wherein the logic circuit initiates the operation of the timing circuit;
  wherein the timing circuit electrically connects to the pump signal of the logic circuit;
  wherein when the timing circuit detects the pump signal the timing circuit sends an electrical signal to the first transistor for a previously determined amount of time;
  wherein the timing circuit controls the amount of hand sanitizer that pump discharges for use.

10. The automatic vehicular sanitizer dispenser according to claim 9
  wherein each of the plurality of sensors is an electric sensor;
  wherein the logic circuit monitors the operation of each of the plurality of sensors;
  wherein a sensor selected from the plurality of sensors indicates to the logic circuit that an object is underneath the nozzle of the reservoir;
  wherein a sensor selected from the plurality of sensors indicates to the logic circuit the amount of hand sanitizer contained within the containment housing of the reservoir.

11. The automatic vehicular sanitizer dispenser according to claim 10 wherein the plurality of sensors comprises a proximity sensor and a level sensor;
  wherein the proximity sensor is an electric sensor;
  wherein the proximity sensor detects the presence of an object in the proximity of the proximity sensor;
  wherein when the proximity sensor detects the presence of an object, the proximity sensor generates an electric signal that the logic circuit detects and interprets as its signal to initiate the operation of the pump;
  wherein the level sensor is an electric sensor;
  wherein the level sensor detects the amount of hand sanitizer contained within the containment housing;
  wherein when the level sensor detects the presence of an object, the level sensor generates an electric signal that the logic circuit detects and interprets as its signal to dispense a dose of the hand sanitizer;
  wherein the level sensor is selected from the group consisting of a float switch and a conductive sensor.

12. The automatic vehicular sanitizer dispenser according to claim 11
  wherein the plurality of transistors comprises a first transistor and a second transistor;
  wherein the first transistor is an electrically controlled switching structure;
  wherein the first transistor controls the flow of electricity from the master switch of the control circuit into the pump;
  wherein the first transistor electrically connects to the timing circuit;
  wherein the second transistor is an electrically controlled switching structure;
  wherein the second transistor controls the flow of electricity from the master switch of the control circuit into the pump;
  wherein the second transistor electrically connects to the alarm signal of the logic circuit.

13. The automatic vehicular sanitizer dispenser according to claim 12
  wherein the first transistor comprises a first collector, a first emitter, and a first base;
  wherein the first transistor operates as a switch;
  wherein when a voltage is applied to the first base, electric current will flow into the first base and the first transistor will act like a closed switch allowing current to flow from the first collector to the first emitter;
  wherein when the voltage is removed from the first base, the first transistor will act like an open switch disrupting current flow from the first collector to the first emitter;
  wherein the first collector is the lead of the first transistor that electrically connects to the master switch;
  wherein when the first base enables the operation of the first transistor, the first collector draws dc electrical energy from the VECU and through the master switch into the first transistor;
  wherein the first emitter is the lead of the first transistor that electrically connects to the pump;
  wherein when the first base enables the operation of the first transistor, the first base transfers the dc electrical energy received from the first collector into the pump;
  wherein the first base is the lead of the first transistor that electrically connects to the timing circuit;
  wherein the first base actuates the switching function of the first transistor;
  wherein when the logic circuit initiates the operation of the timing circuit, the timing circuit generates an electric current that enters the first transistor through the first base;
  wherein the logic circuit initiates the operation of the timing circuit through an electric signal provided through the pump signal;
  wherein the second transistor comprises a second collector, a second emitter, and a second base;
  wherein the second transistor operates as a switch;
  wherein when a voltage is applied to the second base, electric current will flow into the second base and the second transistor will act like a closed switch allowing current to flow from the second collector to the second emitter;
  wherein when the voltage is removed from the second base, the second transistor will act like an open switch disrupting current flow from the second collector to the second emitter;
  wherein the second collector is the lead of the second transistor that electrically connects to the master switch;
  wherein when the second base enables the operation of the second transistor, the second collector draws dc electrical energy from the VECU and through the master switch into the second transistor;
  wherein the second emitter is the lead of the second transistor that electrically connects to the LED;
  wherein when the second base enables the operation of the second transistor, the second base transfers the dc electrical energy received from the second collector into the LED;
  wherein the second base is the lead of the second transistor that electrically connects to the logic circuit;
  wherein the second base actuates the switching function of the second transistor.

14. The automatic vehicular sanitizer dispenser according to claim 13
  wherein the logic circuit further comprises a pump signal and an alarm signal;
  wherein the pump signal is an electric signal generated by the logic circuit;

wherein the activation of the proximity sensor triggers the logic circuit to generate the pump signal;

wherein the alarm signal is an electric signal generated by the logic circuit;

wherein the activation of the level sensor triggers the logic circuit to generate the alarm signal;

wherein each of the plurality of transistors is an electrically controlled switching structure;

wherein the logic circuit uses a first transistor selected from the plurality of transistors to control the operation of the pump;

wherein the logic circuit uses a second transistor selected from the plurality of transistors to control the operation of the visual indication of the amount of hand sanitizer;

wherein the logic circuit electrically connects to the second base of the second transistor using the alarm signal;

wherein the logic circuit initiates the operation of the timing circuit through an electric signal provided through the alarm signal;

wherein the introduction of electric current into the second transistor through the second base causes the second transistor to act like a closed switch that transfers dc electric energy into the LED.

15. The automatic vehicular sanitizer dispenser according to claim 14 wherein the LED is an electrical circuit element;

wherein the LED is a diode;

wherein the LED generates an illumination when an electric current passes through the LED;

wherein the generated illumination provides the visual indication of the amount of hand sanitizer contained in the containment housing is below the previously determined amount;

wherein the LED forms a series electrical connection between the second emitter of the second transistor and the limit resistor;

wherein the limit resistor is an electric circuit element;

wherein the limit resistor forms a series electrical connection between the LED and the VECU of the vehicle;

wherein the limit resistor limits the flow of electricity through the LED.

16. The automatic vehicular sanitizer dispenser according to claim 15 wherein the master switch is a maintained switch;

wherein the master switch enables and disables the operation of the control circuit;

wherein the master switch controls the flow of dc electrical energy from the VECU of the vehicle into the control circuit;

wherein the master switch electrically connects to the VECU to the logic circuit and the plurality of transistors of the control circuit.

17. The automatic vehicular sanitizer dispenser according to claim 16 wherein the control circuit housing is a rigid casing;

wherein the control circuit housing contains the balance of the control circuit;

wherein the containment housing mechanically attaches to the control circuit by inserting into the control circuit housing.

\* \* \* \* \*